(12) United States Patent
Krozel et al.

(10) Patent No.: US 7,914,618 B1
(45) Date of Patent: Mar. 29, 2011

(54) FLOWABLE CEMENT-BASED MATERIAL AND METHODS OF MANUFACTURING AND USING SAME

(75) Inventors: Jeffrey Jerald Krozel, Hinsdale, IL (US); Gary Lee Matney, Greenwood, IN (US)

(73) Assignee: VCNA Prairie IP, Inc., Bridgeview, IL (US)

( * ) Notice: Subject to any disclaimer, the term of this patent is extended or adjusted under 35 U.S.C. 154(b) by 37 days.

(21) Appl. No.: 11/424,154

(22) Filed: Jun. 14, 2006

Related U.S. Application Data

(63) Continuation of application No. 11/378,572, filed on Mar. 17, 2006, now abandoned, which is a continuation of application No. 11/190,637, filed on Jul. 27, 2005, now abandoned.

(60) Provisional application No. 60/592,054, filed on Jul. 28, 2004.

(51) Int. Cl.
C04B 40/00 (2006.01)
C04B 7/00 (2006.01)
C04B 14/00 (2006.01)
C04B 24/00 (2006.01)

(52) U.S. Cl. ........................ 106/819; 106/606

(58) Field of Classification Search ............ 106/606, 106/724, 789, 819, 785; 428/404
See application file for complete search history.

(56) References Cited

U.S. PATENT DOCUMENTS

| | | | | |
|---|---|---|---|---|
| 3,666,703 A * | 5/1972 | Murata et al. | ................ | 523/145 |
| 4,083,729 A * | 4/1978 | Yamada et al. | ............... | 106/678 |
| 4,238,242 A * | 12/1980 | Park | ............................ | 523/204 |
| 4,374,672 A | 2/1983 | Funston et al. | | |
| 4,818,143 A * | 4/1989 | Chou | ........................... | 588/318 |
| 5,106,422 A | 4/1992 | Bennett et al. | | |
| 5,654,352 A | 8/1997 | MacDonald | | |
| 5,951,751 A | 9/1999 | Williams et al. | | |
| 6,277,189 B1 * | 8/2001 | Chugh | ......................... | 106/705 |
| 6,514,334 B1 * | 2/2003 | Perry et al. | ................... | 106/713 |
| 2005/0172863 A1 * | 8/2005 | Terzo | ........................... | 106/724 |

OTHER PUBLICATIONS

Dean Plank—"Using flowable fill in residential applications saves money. Flowing Profits", The Concrete Producer—Jan. 2004—pp. 54, 56-58.

Check Sheet #24—State of Illinois, Department of Transportation, Special Provision for Controlled Low Strength Material (CLSM) Effective Jan. 1, 1990 Revised Mar. 1, 2005 pp. 164-168.

* cited by examiner

*Primary Examiner* — Anthony J Green
*Assistant Examiner* — Pegah Parvini
(74) *Attorney, Agent, or Firm* — K&L Gates LLP

(57) ABSTRACT

Flowable materials and methods of manufacture and use are provided. The flowable fill materials include a cement-based fill material with a cement component and an aggregate component that are mixed with a chemical agent and the like in water. This provides the cement-based material in a flowable state that can be controllably set over time.

10 Claims, No Drawings

FLOWABLE CEMENT-BASED MATERIAL AND METHODS OF MANUFACTURING AND USING SAME

CROSS REFERENCE TO RELATED APPLICATION

The present application is a continuation of U.S. patent application Ser. No. 11/378,572 filed on Mar. 17, 2006, now abandoned, which is a continuation of U.S. patent application Ser. No. 11/190,637, filed on Jul. 27, 2005, now abandoned, which claims priority to U.S. Patent Application No. 60/592,054 filed on Jul. 28, 2004, the disclosures of which are incorporated herein by reference.

BACKGROUND

The present invention generally relates to flowable materials. More specifically, the present invention relates to flowable cement-based materials and methods of manufacture and use of same.

In general, a number of different fill materials are known and used. In use, the fill material is typically placed into an open area such that the open area is filled with the fill material in at least a substantial amount. The fill material can then be covered or capped with an additional layer or layers of material, such as a ready-mix concrete.

One common type of fill material includes sand, rock, gravel and/or other like materials. This type of material is routinely placed into the fill area in a layered configuration. However, the use of this type of fill material can be problematic. For example, the use of sand-type fill materials and the like may be difficult when applied to areas, such as confined spaces. In this regard, additional handling of this type of material may be necessary to ensure that the confined space is adequately filled with the fill material. Further, the use of sand-type materials and the like may require additional preparation to the area prior to filling the area. For example, excavation may be required to prepare and ready the area for filling purposes, particularly as applied to undercut areas.

Other types of known fill material include flowable fill materials, such as controlled low-strength mixtures (CLSM) and the like. One type of flowable fill material is disclosed in U.S. Pat. No. 4,374,672. This type of fill material has fly ash as its major constituent. The fill material includes 45-80% by weight of fly ash. As further disclosed, the fill material is produced and deposited under water to construct a causeway across a body of water.

Another type of flowable fill material is disclosed in U.S. Pat. No. 5,951,751. This type of flowable fill material is a lime-based CLSM that does not require cement or other self-setting adhesive products to achieve its desired strength and mechanical properties.

Due to its flowable nature, the flowable fill material, in general, can more effectively fill an open area or space as compared to conventional non-flowable fill materials, such as with respect to sand-type fill materials and the like as previously discussed. However, the use of known flowable fill materials can be problematic as these types of materials are known to prematurely set or harden during use.

A need therefore exists to provide improved flowable materials that can be readily handled for effective use, such as a fill material.

SUMMARY

The present invention generally relates to flowable materials. More specifically, the present invention relates to flowable cement-based materials and methods of manufacture and use of same.

The flowable cement-based materials of the present invention include a cement component and an aggregate component that are mixed with a chemical agent and water to provide a flowable state. The chemical agent, such as an air-entraining agent, and water are added in an effective amount such that the flowable state can be controllably formed into a settable state. In this regard, the set characteristics of the flowable material can be controlled by varying the amount of chemical agent and water, and thus not controlled by the amount of cement and/or other like materials that may be added to the flowable material.

To this end, in an embodiment the present invention provides an air-entrained cement-based material. The air-entrained cement-based material includes an aggregate component that is mixed in water and about 2% or less by weight of an air-entraining agent to form the air-entrained cement-based material in a flowable state that includes about 1% or less by weight of cement.

In an embodiment, the flowable state is controllably settable by the air-entraining agent and water that is added to the flowable state.

In an embodiment, the amount of water includes about 20% by weight or less.

In an embodiment, the flowable state is settable to a settable state after about 5 minutes to about 24 hours.

In an embodiment, the settable state is diggable at about 100 psi or less of force, such as at about 75 psi or less of force.

In an embodiment, the air-entrained cement-based material further comprises one or more chemical agents, such as a water reducing agent, a non-chloride accelerator, and the like.

In an embodiment, the air-entrained cement-based material does not include fly ash.

In another embodiment, the present invention provides a flowable cement-based material. The flowable cement-based material includes a cement component at about 1% by weight or less; an aggregate component at about 75% by weight or greater; a water component ranging from about 11% by weight to about 17% by weight; and a chemical agent at about 2% by weight or less wherein the chemical agent at least includes an air-entraining agent.

In an embodiment, the cement component includes Portland cement.

In an embodiment, the flowable cement-based material further comprises one or more cementitious materials, such as ground granulated blast furnace slag, cement kiln dust and combinations thereof, in an amount of up to about 2% by weight or less.

In an embodiment, the chemical agent further comprises an additional chemical agent, such as a water reducing agent, a non-chloride accelerator, and combinations thereof.

In an embodiment, the aggregate component includes a fine aggregate material.

In an embodiment, the fine aggregate material is about ⅜ inches or less in size.

In yet another embodiment, the present invention provides a method of preparing a cement-based material in a flowable state. The method includes providing a cement component, an aggregate component, and a chemical agent at least including an air-entraining agent; mixing and further processing the cement component, the aggregate component and the chemical agent in water; and forming the flowable state at about 1% or less by weight of the cement component, at about 75% or more by weight of the aggregate component, at about 20% or less by weight of water, and at about 2% or less by weight of the chemical agent.

In an embodiment, the flowable state is set in a controlled manner by addition of water and the chemical agent to the flowable state.

In an embodiment, the flowable state is set after about 10 minutes or more.

In an embodiment, the cement component includes Portland cement.

In an embodiment, the aggregate component includes a fine aggregate material that complies with ASTM C 33.

In an embodiment, the chemical agent includes an additional chemical agent, such as a water reducing agent, a non-chloride accelerator, and combinations thereof.

In still yet another embodiment, the present invention provides a method of filling an area with a flowable cement-based material. The method includes preparing the flowable cement-based material including a cement component and an aggregate component that are mixed with a chemical agent including an air-entraining agent and water; and filling the area with the flowable cement-based material wherein the flowable cement-based material includes about 1% by weight or less, about 2% by weight or less of the chemical agent and about 20% by weight or less of water allowing the flowable cement-based material to be set in a controlled manner.

In an embodiment, the flowable cement-based material is controllably set and subsequently a material layer that includes concrete is placed over the set material for backfilling purposes.

In an embodiment, the flowable cement-based material is used to fill an undercut area.

In an embodiment, the flowable cement-based material can support the undercut area without having to remove at least a portion of the undercut area.

In an embodiment, the flowable cement-based material is used to fill a confined space.

In an embodiment, the flowable cement-based material is set in a controlled manner in about 5 minutes or more.

An advantage of the present invention is to provide improved flowable materials.

Another advantage of the present invention is to provide improved methods of manufacture and use regarding flowable cement-based materials.

Yet another advantage of the present invention is to provide improved backfilling materials and uses thereof.

Still yet another advantage of the present invention is to provide a flowable cement-based material that can be poured and set into a confined space without the need for personnel to be in the confined space for proper placement and consolidation.

A further advantage of the present invention is to provide a flowable cement-based material that has controllable set characteristics.

Another advantage of the present invention is to provide a flowable cement-based material that has fast and effective set characteristics.

Yet a further advantage of the present invention is to provide a flowable fill material that can be used to support undercut conditions associated with various municipal repair jobs and the like.

Still yet a further advantage of the present invention is to provide flowable fill materials that can allow rapid reconstruction and repair of an area to be filled with the flowable material.

Additional features and advantages are described herein, and will be apparent from the following Detailed Description.

DETAILED DESCRIPTION

The present invention generally relates to flowable materials and methods of manufacture and use regarding same. In particular, the present invention relates to flowable cement-based materials.

The flowable materials of the present invention at least include a cement component and an aggregate component that are mixed with one or more chemical agents or additives and water in a sufficient amount. This provides a cement-based material in a flowable state that can be set in a controlled manner. In this regard, the cement or other like cementitious materials are not utilized as the primary component for controlling the set characteristics of the flowable material of the present invention. Applicants have discovered that the set characteristics can be effectively controlled by adding an effective amount of a chemical agent including an air-entraining agent in addition to water to the cement and aggregate components. The amount of cement or other like material is then utilized to control the ultimate strength of the material over the long-term of use, such as at or beyond 28 days from the initial set point of the flowable material.

While not being bound to any particular theory, it is believed that the addition of the chemical agent and water in an effective amount allows the material components of the flowable material to be mixed in a homogenous manner. This can promote control of the set characteristics of the flowable materials. For example, the homogenous mixing can act to minimize, or effectively eliminate, the formation of a cementitious over layer upon setting of the flowable material. The formation of the cementitious over layer may cause the set product to have undesirable strength and mechanical properties.

The homogenous mixing may also facilitate control of the set time of the flowable product. The set time can be varied depending on the specific needs of the application. In an embodiment, the set time can be effectively controlled at about 5 minutes or more, such from about 10 minutes to about 24 hours, preferably about one hour, by the addition of one or more chemical agents that at least includes an air-entraining agent in addition to water as previously discussed. The controllable set characteristics of the flowable materials can facilitate use of same. For example, the flowable materials can be effectively utilized as a fill material in a variety of different applications to provide rapid and effective reconstruction and repair of areas, such as undercuts, street cuts, confined spaces and other suitable areas in need of reconstruction and repair.

Further, the addition of air at sufficient levels and in microscopic form (i.e., bubbles) via an air-entraining agent can promote the controllable set characteristic of the flowable material that has a low cement content, such as about 1% by weight or less. In addition to promoting mixing, the air is believed to allow the material to retain an effective amount of water that is necessary to cause the flowable material to set in a controlled manner. As previously discussed, the material can be set in about 5 minutes or more after which time the set material has a sufficient amount of compaction strength for use.

Upon setting, the material is effectively non-corrosive with respect to objects, such as pipes and the like, that are encased in the set material during use. As previously discussed, the flowable material of the present invention does not include fly ash pursuant to an embodiment and thus further promotes the non-corrosive nature of the material.

The flowable materials of the present invention can include any number, amount and suitable types of material components. In an embodiment, the flowable materials at least include a cement component, an aggregate and at least further includes a chemical agent including an air-entraining agent in addition to water in a sufficient amount to effectively control the set characteristics of the flowable material. The cement component in an embodiment includes Portland cement, preferably types I-V or combinations thereof. In addition, the cement component can further include other material components, such as ground granulated blast furnace slag, kiln dust, cement kiln dust, the like, and combinations thereof. The additional cement components can be derived from any suitable materials and in any suitable manner. For example, the kiln dust can be derived from the manufacture of Portland cement.

In an embodiment, the cement component includes about 1% by weight or less. The amount of cement component can be increased up to about 3% by weight such as where about 1% by weight or less of Portland cement or the like is used in combination with one or more other cementitious materials including ground granulated blast furnace slag, cement kiln dust and the like.

The aggregate component can include any suitable type of aggregate. In an embodiment, the aggregate includes a fine aggregate, such as a fine aggregate that complies with ASTM C 33. The fine aggregate can include any suitable size, preferably about 3/8 inches or less in size. The aggregate material can include natural materials, manufactured aggregate materials or combinations thereof. In an embodiment, the natural aggregate material is native to the area where the flowable material is manufactured and used, surrounding areas thereof, other suitable and compatible types of materials, and combinations thereof. For example, the flowable material was made with sand that was native to an area and surrounding areas thereof where the flowable material was field tested as described in greater detail below pursuant to an embodiment.

The manufactured fine aggregates can include recycled materials, reclaimed materials, the like or combinations thereof. For example, the manufactured fine aggregates can include quarry waste products. In an embodiment, the aggregate component includes about 75% by weight or more, preferably about 75% by weight to about 86% by weight of the flowable material.

The water component in an embodiment includes at about 20% by weight or less of the flowable material. Preferably, the water component includes about 11% by weight to about 17% by weight. The water component can be derived from any suitable water source for processing purposes. In an embodiment, the water component includes potable water, recycled or reclaimed water, such as from the production of concrete, the like or combinations thereof.

As previously discussed, Applicants have discovered that the set characteristics can be effectively controlled by varying the amount of chemical agent added to the flowable material. The chemical agent at least includes an air-entraining agent. In addition, the chemical agent can include a non-chloride accelerator, a water reducing agent, the like or mixtures and combinations thereof. The addition of these types of agents can promote fast and effective set characteristics, such as within about 5 minutes or more, preferably within about 1 hour or more.

In an embodiment, the chemical agent includes about 2% by weight or less of the flowable material for effective control of the set characteristics. For example, the air-entraining agent can be added at about 2.0 ounces per 100 pounds of cement or more, where additional types of chemical agents including non-chloride accelerators and the like can be added at about 100 ounces per 100 pounds of cement or more. The chemical agent can include any suitable type of material, such as any suitable type of commercially-available product. For example, the air-entraining agent includes MBVR in standard or concentrate that is commercially-available from DEGUSSA ADMIXTURES, INC. and/or other types of suitable and compatible materials.

The material components of the flowable material can be added in any suitable amount, such as any suitable amount within the defined weight percentages associated with each component as defined herein. In an embodiment, the cement component ranges from about 25 pounds per cubic yard to about 40 pounds per cubic yard; the aggregate component ranges from about 3090 pounds per cubic yard to about 3130 pounds per cubic yard; the water component ranges from about 60 gallons per cubic yard to about 70 gallons per cubic yard; the air entraining component ranges from about 2.0 ounces per 100 pounds of cement to about 5.0 ounces per 100 pounds of cement; and an additional chemical agent (e.g., non-chloride accelerator) ranges from about 100 ounces per 100 pounds of cement to about 150 ounces per 100 pounds of cement.

The flowable materials of the present invention can be manufactured in any suitable manner. In general, the various components of the flowable materials are mixed and further processed in a sufficient amount of water such that the desired mechanical properties, strength properties and the like can be achieved. The flowable product can include a number of different material components, such as the cement component and the aggregate component mixed with the air-entraining agent in addition to other types of chemical agents and water as previously discussed.

The material components once processed form a liquid and flowable state. After a desired period of time, the flowable state can set to a settable state in a controlled manner. As previously discussed, Applicants have discovered that the set characteristics can be controlled by varying the amount of water and chemical admixtures, such as air-entraining agents in addition to other types of chemical agents, such as non-chloride accelerators and the like, and thus not primarily rely on cementitious materials, pozzolanic materials, the like, or combinations thereof for such purpose.

In an embodiment, the flowable materials are processed in a redi-mix concrete batch plant and once processed can be delivered for use in a redi-mix concrete truck. The flowable materials of the present invention in an embodiment have a shelf life of at least up to about three hours. Further, the flowable material in flowable form can remain shelf-stable over temperatures that range from about 40° F. to about 100° F., such as ambient temperatures. Specific manufacturing procedures are provided pursuant to an embodiment as follows:

1. All ingredients except liquid chemical admixtures and water are measured by mass. Liquid chemical admixtures are measured by volume. Water can be measured by volume or mass.
2. All measurements are taken according to the tolerances established in ASTM C 94.
3. Once all of the ingredients have been properly measured, the ingredients are introduced into the mixing apparatus as follows:
    a) Approximately 75% by weight of the total batch water (adjusted for aggregate moisture) is introduced along with the air-entraining admixture.
    b) The fine aggregate is added at an even flow under a steady loading sequence. After about 25% by weight of the fine aggregate has been introduced, the cement and other cementitious materials are added at an even flow under a steady loading sequence and are to be completely introduced before the last approximate 25% by weight of the fine aggregate is introduced.
    c) The remaining approximate 25% by weight of the total batch water and all other chemical admixtures are introduced once the fine aggregate addition has been completed.

d) The batch is then mixed with the proper number of revolutions to insure that a uniform mass is created throughout the batch according to ASTM C 94.

The mixing apparatus can include any suitable type. For example, the mixing apparatus in an embodiment can include a central mix batch plant, a transit mix batch plant and the like.

A preferred composition of the flowable cement-based material of the present invention includes about 1% by weight or less of the cement component, about 75% to about 86% by weight of the aggregate component, about 11% to about 17% by weight of water, and up to and including about 2% of the chemical admixture, such as the air-entraining agent. In an embodiment, the bulk density of the flowable material is greater than 125 pounds per cubic feet ("pcf"), preferably about 135 pcf to about 138 pcf. Once set, the product has a compressive strength that is about 200 psi or less in an embodiment, preferably about 100 psi or less. Further, the set product in an embodiment has a diggable strength of about 100 psi or less. In this regard, the set product can be readily excavated with conventional handheld digging tools.

Examples illustrative of the present invention are provided below according to various embodiments without limitation:

FLOWABLE MATERIAL EXAMPLES

| Flowable Material Component | Amount |
| --- | --- |
| Cement (Type I) | 38 lbs./yd$^3$-40 lbs./yd$^3$ |
| Sand (FA-2) | 3090 lbs./yd$^3$-3130 lbs./yd$^3$ |
| Water | 60 gal./yd$^3$ |
| Air-Entraining Agent | 2.0 oz./100 lbs. of cement |
| POZZUTEC 20 (non-chloride accelerator) | 100 oz./100 lbs. of cement |
| POZZOLITH 122 HE (High-Early Accelerator) | 100 oz./100 lbs. of cement |
| Cement (Type I) | 38 lbs./yd$^3$-40 lbs./yd$^3$ |
| Sand (FA-2) | 3090 lbs./yd$^3$-3130 lbs./yd$^3$ |
| Water | 60 gal./yd$^3$ |
| Air-Entraining Agent | 2.0 oz./100 lbs. of cement |
| POZZUTEC 20 (non-chloride accelerator) | 100 oz./100 lbs. of cement |
| Cement (Type I) | 25 lbs./yd$^3$ |
| Sand (FA-2) | 3130 lbs./yd$^3$ |
| Water | 60 gal./yd$^3$ |
| Air-Entraining Agent | 2.0 oz./100 lbs. of cement |
| POZZUTEC 20 (non-chloride accelerator) | 100 oz./100 lbs. of cement |

A flowable material made pursuant to an embodiment has been field tested. The flowable material was transported to the field test site in Chicago, Ill. in two redi-mix concrete trucks.

The test material was made with an aggregate material including Sand (FA-2) that was native to the test area and surrounding areas thereof. However, any suitable and compatible aggregate materials can be utilized as previously discussed. The test area to be filled was an excavated area in size of about 2500 cubic feet.

The test area was filled over a period of about 15 minutes. The total amount of flowable material used to fill the excavated area was about 9¼ cubic yards. The flowable material set within about 20 minutes such that the set product was able to support, at a minimum, an adult's weight standing on the material.

It should be appreciated that the flowable materials of the present invention can be utilized in a variety of different applications. Illustrative examples of applications associated with the flowable material include structural fill, backfill soil stabilization, trench fill, tank remediation fill, excavation repair, repair of pipes for water leaks, sub base for paving brick and pipe fill, and the like.

Preferably, the flowable materials are used as a fill material pursuant to an embodiment. The fill material can be used to reconstruct and repair areas in need of same, such as open areas, excavated areas, street cuts, undercuts, confined spaces and/or the like. For example, the flowable materials can be utilized to assist municipalities and the like with street and/or other types of structural repairs. The ability of the flowable materials to provide rapid repair and reconstruction allows the area to be ready again for use within hours or less after the repair has been completed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An air-entrained cement-based material consisting of an aggregate component composed of a sand aggregate and about 1% or less by weight of cement that is mixed in water and an air-entraining agent to form the air-entrained cement-based material in a flowable state, wherein the air-entrained cement-based material optionally consists of at least one of a water reducing agent and a non-chloride accelerator.

2. The air-entrained cement-based material of claim 1, wherein the amount of water includes about 20% by weight or less.

3. The air-entrained cement-based material of claim 2, wherein the flowable state is settable to a settable state after about 5 minutes to about 24 hours.

4. The air-entrained cement-based material of claim 3, wherein the settable state is diggable at about 200 psi or less of force.

5. The air-entrained cement-based material of claim 1, wherein the cement includes Portland Cement.

6. A flowable cement-based material consisting of:
   a cement component at about 1% by weight or less;
   an aggregate component composed of a sand aggregate at about 75% by weight or greater;
   a water component ranging from about 11% by weight to about 17% by weight;
   an air-entrained agent at about 2% by weight or less; and
   optionally consisting of at least one of a cementitious material in an amount of up to about 2% by weight or less, a water reducing agent, and a non-chloride accelerator.

7. The flowable cement-based material of claim 6, wherein the cement component includes Portland cement.

8. The flowable cement-based material of claim 6, wherein the cementitious material is selected from the group consisting of ground granulated blast furnace slag, cement kiln dust, fly ash and combinations thereof.

9. The flowable cement-based material of claim 6, wherein the sand aggregate is a fine aggregate material.

10. The flowable cement-based material of claim 9, wherein the fine aggregate material is about ⅜ inches or less in size.

* * * * *